(12) United States Patent
Lusted et al.

(10) Patent No.: US 7,854,584 B2
(45) Date of Patent: Dec. 21, 2010

(54) BARRIER SEALING SYSTEM FOR CENTRIFUGAL COMPRESSORS

(75) Inventors: Roderick Mark Lusted, Niskayuna, NY (US); Christopher Edward Wolfe, Niskayuna, NY (US); Eric John Ruggiero, Rensselaer, NY (US); Gabriele Mariotti, Florence (IT)

(73) Assignee: General Electric Company, Niskayuna, NY (US)

( * ) Notice: Subject to any disclaimer, the term of this patent is extended or adjusted under 35 U.S.C. 154(b) by 821 days.

(21) Appl. No.: 11/753,014

(22) Filed: May 24, 2007

(65) Prior Publication Data
US 2008/0290604 A1    Nov. 27, 2008

(51) Int. Cl.
*F01D 11/02* (2006.01)
*F16J 15/44* (2006.01)

(52) U.S. Cl. .............. 415/111; 415/174.2; 415/231; 277/355

(58) Field of Classification Search ............ 415/111, 415/112, 113, 170.1, 174.2, 174.5, 230, 231, 415/175, 176; 277/355; 418–420, 350
See application file for complete search history.

(56) References Cited

U.S. PATENT DOCUMENTS

| | | | |
|---|---|---|---|
| 5,249,812 A | 10/1993 | Volden et al. | |
| 5,713,576 A | 2/1998 | Wasser et al. | |
| 5,961,280 A * | 10/1999 | Turnquist et al. | 415/173.3 |
| 5,975,535 A * | 11/1999 | Gail et al. | 277/355 |
| 6,210,107 B1 | 4/2001 | Volden et al. | |
| 6,406,027 B1 * | 6/2002 | Aksit et al. | 277/355 |
| 6,524,059 B1 | 2/2003 | Nogiwa | |
| 6,609,888 B1 | 8/2003 | Ingistov | |
| 6,648,334 B2 * | 11/2003 | Inoue | 277/355 |
| 7,195,800 B2 | 3/2007 | Sugano et al. | |
| 2002/0197154 A1 | 12/2002 | Nogiwa | |

FOREIGN PATENT DOCUMENTS

| | | |
|---|---|---|
| EP | 10708882 A2 | 1/2001 |
| JP | 2006233899 A | 9/2006 |
| WO | 02/088578 A1 | 11/2002 |

OTHER PUBLICATIONS

"EP Search Report for EP08156777; Dated Sep. 22, 2008."; (5 Pages).

* cited by examiner

*Primary Examiner*—Igor Kershteyn
(74) *Attorney, Agent, or Firm*—Ann M. Agosti (57) ABSTRACT

A rotary machine includes a machine rotor, a bearing coupled to the machine rotor, a machine stator, and a sealing device disposed between the machine rotor and the machine stator. The sealing device includes a dry gas seal and first and second seals disposed between the dry gas seal and the bearing. One or both of the first and second seals includes a brush seal or more specifically a brush seal including a plurality of non-metallic fibers.

18 Claims, 5 Drawing Sheets

BARRIER SEALING SYSTEM FOR CENTRIFUGAL COMPRESSORS

BACKGROUND

The disclosed embodiments relate generally to rotary machines and, more particularly, to sealing systems for interfaces between rotating and stationary components.

Rotary machines, such as centrifugal compressors, often use dry gas seals to limit leakage of a process gas along a rotatable shaft to the atmosphere. Lubricating oil supplied to one or more radial bearings of the rotatable shaft often tend to wick along the rotor shaft and foul the tip surfaces of the dry gas seal. Barrier seals (also referred to as "tertiary seals") are provided between the dry gas seals and the radial bearing to prevent migration of oil towards the dry gas seals. Typically, the barrier seal includes a pair of seals with a gas flow path provided between the pair of seals. The barrier seals may include labyrinth seals, carbon face seals, metallic brush seals, or the like.

However, the barrier seals do not effectively prevent migration of oil in case of reduced buffer gas flow. For example, the barrier seals do not effectively prevent migration of oil from the bearing to the dry gas seal if the flow under the seals is relatively small compared with the effective clearances of the seals. Moreover, the consumption of the separation gas between the pair of seals is also increased.

Accordingly, there is a need for a sealing system that effectively prevents migration of oil from one or more bearings to the dry gas seal under the various operational conditions of the machine. Also, there is a need for a sealing system that reduces consumption of a separation gas between the pair of seals.

BRIEF DESCRIPTION

In accordance with one exemplary embodiment of the present invention, a rotary machine includes a machine rotor, a bearing coupled to the machine rotor, a machine stator, and a sealing device disposed between the machine rotor and the machine stator. The sealing device includes a dry gas seal and a first brush seal disposed between the dry gas seal and the bearing. The first brush seal includes a plurality of non-metallic fibers. A second brush seal is disposed on a second side between the first brush seal and the bearing. The second brush seal includes a plurality of non-metallic fibers.

In accordance with another exemplary embodiment of the present invention, a rotary compressor includes a compressor rotor, a bearing coupled to the compressor rotor, a compressor stator, and a sealing device disposed between the compressor rotor and the compressor stator. The sealing device includes a dry gas seal and a first brush seal disposed on a compressor side between the dry gas seal and the bearing. The first brush seal includes a plurality of non-metallic fibers. A second seal is disposed on a bearing side between the first brush seal and the bearing.

In accordance with yet another exemplary embodiment of the present invention, a rotary compressor includes a compressor rotor, a bearing coupled to the compressor rotor, a compressor stator, and a sealing device disposed between the compressor rotor and the compressor stator. The sealing device includes a dry gas seal and a first seal disposed on a compressor side between the dry gas seal and the bearing. A second seal is disposed on a bearing side between the first seal and the bearing. The second seal includes a brush seal having a plurality of non-metallic fibers.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention provide a rotary machine having a sealing device disposed between a machine rotor and a machine stator. The sealing device includes a dry gas seal, a first seal disposed on a first side between the dry gas seal and a bearing provided to the machine rotor, and a second seal disposed on a second side between the first seal and the bearing. In some exemplary embodiments, the first seal comprises a brush seal including non-metallic fibers. In some exemplary embodiments, the second seal comprises a brush seal. In some exemplary embodiments, the first and second seals may comprise brush seals that each include a plurality of non-metallic fibers. The first and second seals are configured to prevent leakage of oil towards the dry gas seal. In certain embodiments, other seals such as labyrinth seals or carbon face seals are used in conjunction with the first and second seals. Usage of non-metallic fibers in particular is expected to prevent leakage of oil under all operating conditions of the rotary machine. Consumption of separation gas between the seals is also reduced. In certain examples, the rotary machine may include a centrifugal compressor. Specific embodiments of the present invention are discussed below referring generally to FIGS. 1-5.

Figure 1:
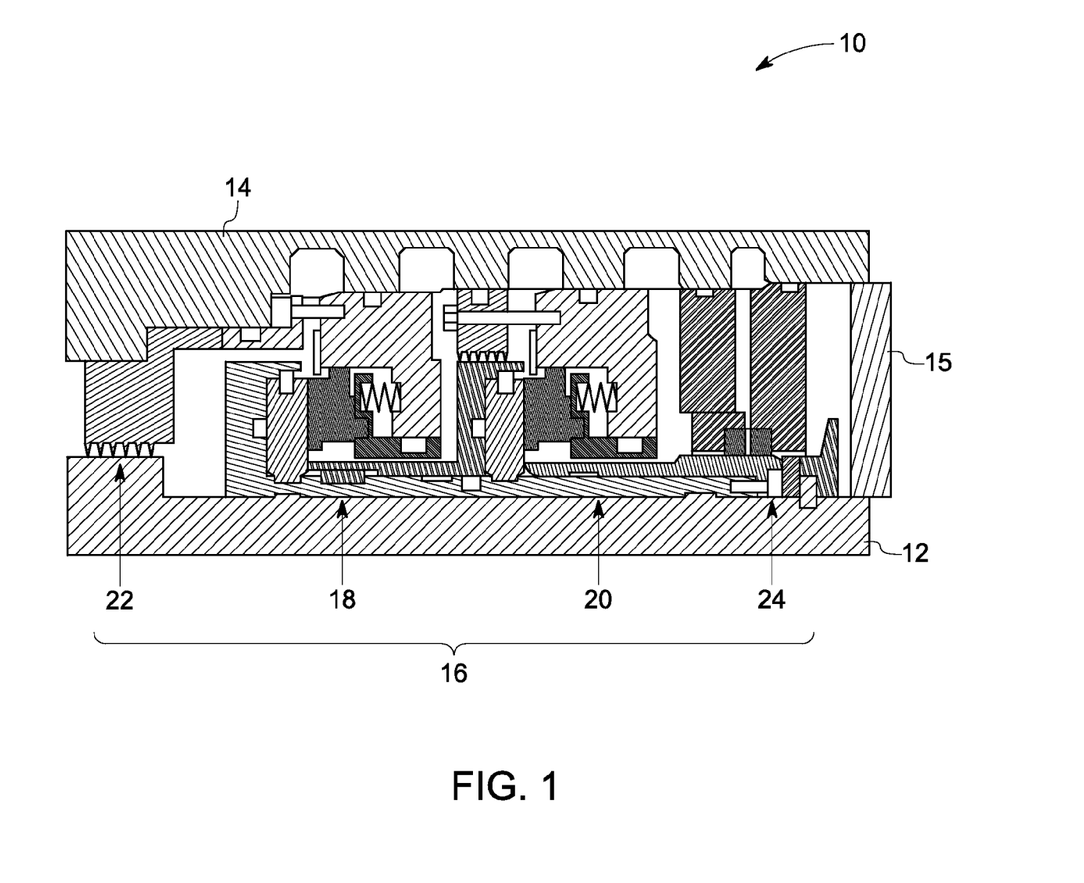
FIG. 1 is a diagrammatical representation of a rotary machine having a sealing device in accordance with an exemplary embodiment disclosed herein.

Referring to FIG. 1, an exemplary rotary machine 10 (such as centrifugal compressor) is illustrated in accordance with an exemplary embodiment of the present invention. The machine 10 includes a machine rotor 12 (such as a compressor shaft) disposed inside a machine stator 14 (sometimes referred to as a "housing"). The machine rotor 12 is supported to the machine stator 14 via one or more support bearings 15. A sealing device 16 is disposed between the machine rotor 12 and the machine stator 14 and configured to reduce leakage of a fluid between the machine rotor 12 and the machine stator 14.

In the illustrated exemplary embodiment, the sealing device 16 comprises a primary dry gas seal 18, a secondary dry gas seal 20, an inner labyrinth seal 22, and a barrier seal 24 configured to reduce leakage of a process gas. The process gas may include gases such as carbon dioxide, hydrogen sulfide, butane, methane, ethane, propane, liquefied natural gas, or a combination thereof. In certain embodiments, more than two dry gas seals may be used, one at each end of the machine rotor 14. In certain other embodiments, a single dry gas seal located directly adjacent to an impeller (not shown) may be used. Each dry gas seal typically includes a mating fluid seal stator (non-rotatable ring) and a fluid seal rotor (rotatable ring). The details of the dry gas seal are not illustrated in FIG. 1. During operation of the machine, grooves in the fluid seal stator and the fluid seal rotor generate a fluid-dynamic force causing the fluid seal stator to separate from the fluid seal rotor creating a "running gap" between the fluid seal stator and the fluid seal rotor. The secondary dry gas seal 20 acts as back-up for the primary dry gas seal 18. It should be noted herein that the illustrated centrifugal compressor is merely an exemplary embodiment, and the dry gas seal in accordance with the embodiment of the present invention may also be applicable to other rotary machines requiring sealing arrangements to prevent leakage of process gas. It may also be noted that the aspects of the present invention are not limited to an association with the rotary machine and may be associated with other machines subjected to dry gas seal contamination during machine operation.

Ingress of foreign materials into the running gap between the fluid seal stator and the fluid seal rotor may affect the seal performance resulting in excess gas leakage to vent path. As a result shearing forces are increased between the fluid seal stator and the fluid seal rotor. The dry gas seals 18, 20 may be contaminated due to variety of factors such as process gas, bearing lubrication oil, or the like. The inner labyrinth seal 22 is configured to separate the process gas from the dry gas seals 18, 20. The barrier seal 24 is configured to separate the primary and secondary gas seals 18, 20 from the compressor shaft bearings 15. The barrier seal 24 may be buffered with air or nitrogen. The barrier seal 24 prohibits the flow of bearing lubrication oil or oil mist into the dry gas seals 18, 20 and is explained in greater detail with reference to subsequent figures.

Figure 2:
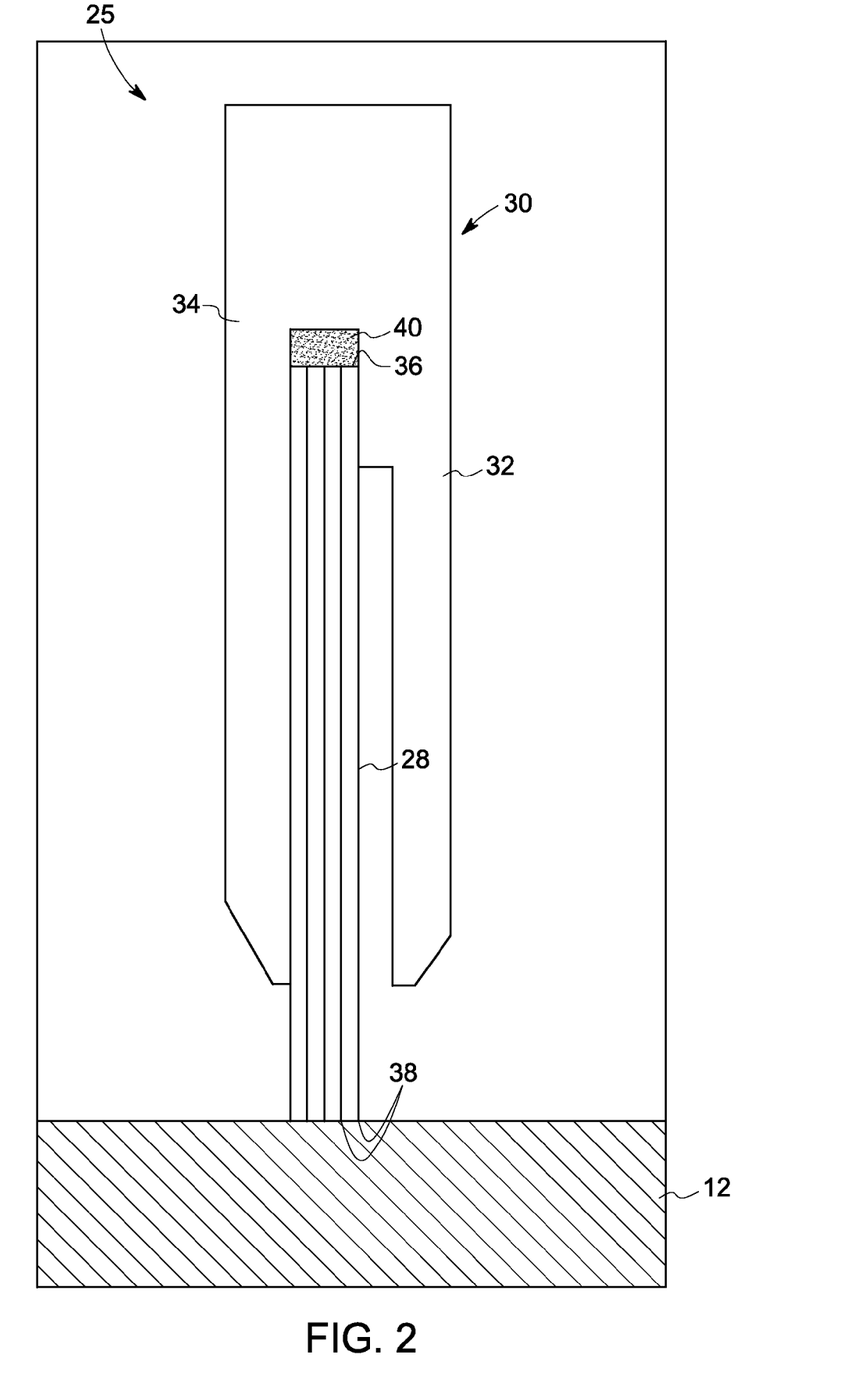
FIG. 2 is a diagrammatical representation of a brush sealing device in accordance with another exemplary embodiment disclosed herein.

Referring to FIG. 2, a detailed view of an exemplary brush seal 25 is illustrated. The Brush seal 25 in accordance with certain aspects of the present invention includes a plurality of non-metallic fibers 28 configured to contact the rotor 12 to reduce leakage of bearing lubrication oil and also reduce temperature at a seal-rotor interface.

The brush seal 25 includes a holding device 30 which may be coupled to the machine stator. The holding device 30 includes a first plate (front plate) 32 and a second plate (back plate) 34. The plurality of non-metallic fibers 28 are disposed between the first plate 32 and the second plate 34 of the holding device 30. Typically, the fibers 28 may be canted at a predetermined angle. As known to those skilled in the art, the canting of fibers 28 improves the compliance of the seal with the rotor 12. Such radial deflection of the fibers 28 advantageously ensures "gentle ride" over the contact surfaces to prevent structural deformation of the fibers. The cant angle depends on trade-off relationship between factors such as, for example, structural stability of the fibers, and ease of assembling the fibers 28 with the plates 32, 34. The fibers 28 sandwiched between the plates 32, 34 are packed dense enough to prevent lubrication oil leakage through the fibers into the dry gas seals. The packing density of the fibers is maintained within predetermined limits in such a way so as to enhance sealing effectiveness and avoid any significant increase of frictional force arising due to frictional contact between the fibers and contact surfaces.

Each fiber 28 includes a first end 36 coupled to the holding device 30 and a second end 38 disposed proximate to the rotor 12. In certain exemplary embodiments, the second end 38 of the fiber 28 is configured to contact the rotor 12. In the illustrated embodiment, the holding device 30 includes a mounting device such as an epoxy material 40 disposed between the first plate 32, and the second plate 34. The epoxy material 40 is configured to couple the non-metallic fibers 28 to the holding device 30. In certain exemplary embodiments, the first and second plates 32, 34 include a metallic material, or a composite material, or a combination thereof. The fibers 28 are clamped between the first and the second plates 32, 34. The first end 36 of each fiber 28 is coupled to the epoxy material 40 and the second end 38 protrudes from the plates 32, 34 towards the rotor 12. In certain other exemplary embodiments, the fibers 28 are heat welded to the plates 32, 34. In certain other exemplary embodiments, the fibers 28 are secured to the plates 32, 34 using annular wires and retaining clamps (not shown).

The non-metallic fibers may include Kevlar fibers, carbon fibers, carbide fibers, or a combination thereof. It should be noted herein that the list of non-metallic fibers is not exhaustive and other non-metallic fibers are also envisaged. Fiber materials and diameters are chosen depending on trade-off relationships among properties such as stiffness, creep resistance, wear resistance, and chemical inertness against oil, for example. Fiber diameters are chosen to ensure structural stability against aerodynamic forces applied thereupon by the working fluid while considering trade-off factors such as structural stability and desired compliance. For example, smaller diameters of non-metallic fibers result in lower effective clearance at the seal-rotary component interface and also lower stiffness resulting in lower heat generation.

Figure 3:
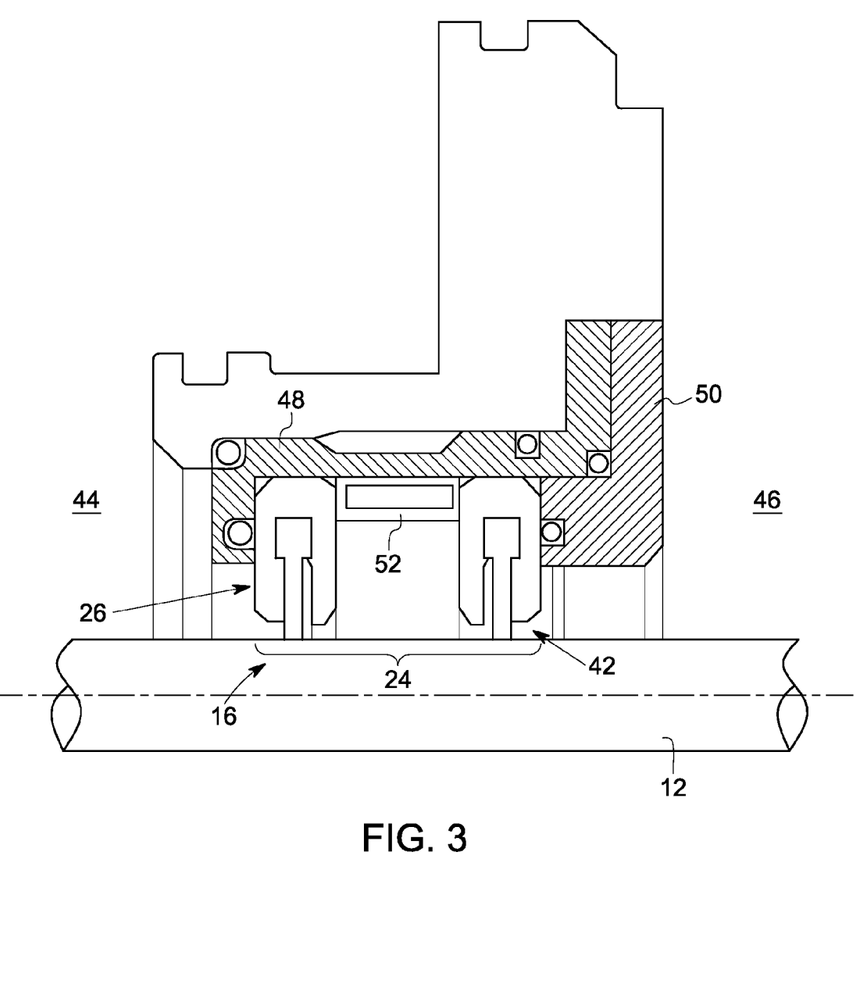
FIG. 3 is a diagrammatical representation of a barrier sealing device having at least two brush seals in accordance with another exemplary embodiment disclosed herein.

Referring to FIG. 3, a barrier seal 24 having a first brush seal 26 and a second brush seal 42 in accordance with another exemplary embodiment of the present invention is illustrated. The first brush seal 26 is disposed on a first side (also referred to as "compressor side") 44 between the dry gas seals and the bearing. The second brush seal 42 is disposed on a second side (also referred to as "bearing side") 46 between the first seal and the bearing. In one exemplary embodiment, first brush seal 26 comprises a seal of the type described with respect to brush seal 25 of FIG. 2. It should be noted herein that the second brush seal 42 may be of the same type or of a different type compared to the first brush seal 26. In one exemplary embodiment, the brush seals 26, 42 are coupled to the stator housing via a housing ring 48 and a clamp ring 50, and a spacer ring 52 is provided between the brush seals 26, 42. A separation gas supply path (not shown) is provided between the brush seals 26, 42 so as to enable flow of a separation gas between the seals 26, 42.

Conventionally carbon face seals, labyrinth seals, and metallic brush seals have been used for preventing migration of bearing lubrication oil into the dry gas seals with the metallic brush seals being situated on the compressor side as compared with the bearing side. Due to the larger shaft clearance associated with labyrinth seals, the amount of injected separation gas required is much higher than for segmented carbon face seals. Carbon face seal do not always prevent migration of bearing lubrication oil into the dry gas seals. Under certain flooded bearing conditions, the very low separation gas flow is simply not enough to "hold back" the migration of bearing lubrication oil into the dry gas seals. In such situations, the dry gas seals need to be lifted away from the bearing lubrication oil, which tends to wick along the rotor shaft 12, so as to prevent fouling the contact surfaces of the dry gas seals.

In accordance with the illustrated exemplary embodiment of the present invention, the barrier seal 24 having the brush seals 26, 42 provides effective barrier seal function in the rotary machine. In particular, when the brush seals 26, 42 having non-metallic fibers of the type described with respect to FIG. 2, the sealing device is expected to effectively prevent migration of bearing lubrication oil during all operating conditions of the rotary machine including startup, and shutdown conditions. The separation gas flow between the brush seals 26, 42 deflects the non-metallic fibers towards the rotary component and the bearing such that the fibers contact the surface of the rotary component and the bearing to maintain a seal thereagainst. Non-metallic brush seals are expected to be particularly useful for preventing migration of bearing lubrication oil under lower separation gas differential pressure and flow rates. The consumption of separation gas is also thereby reduced.

Figure 4:
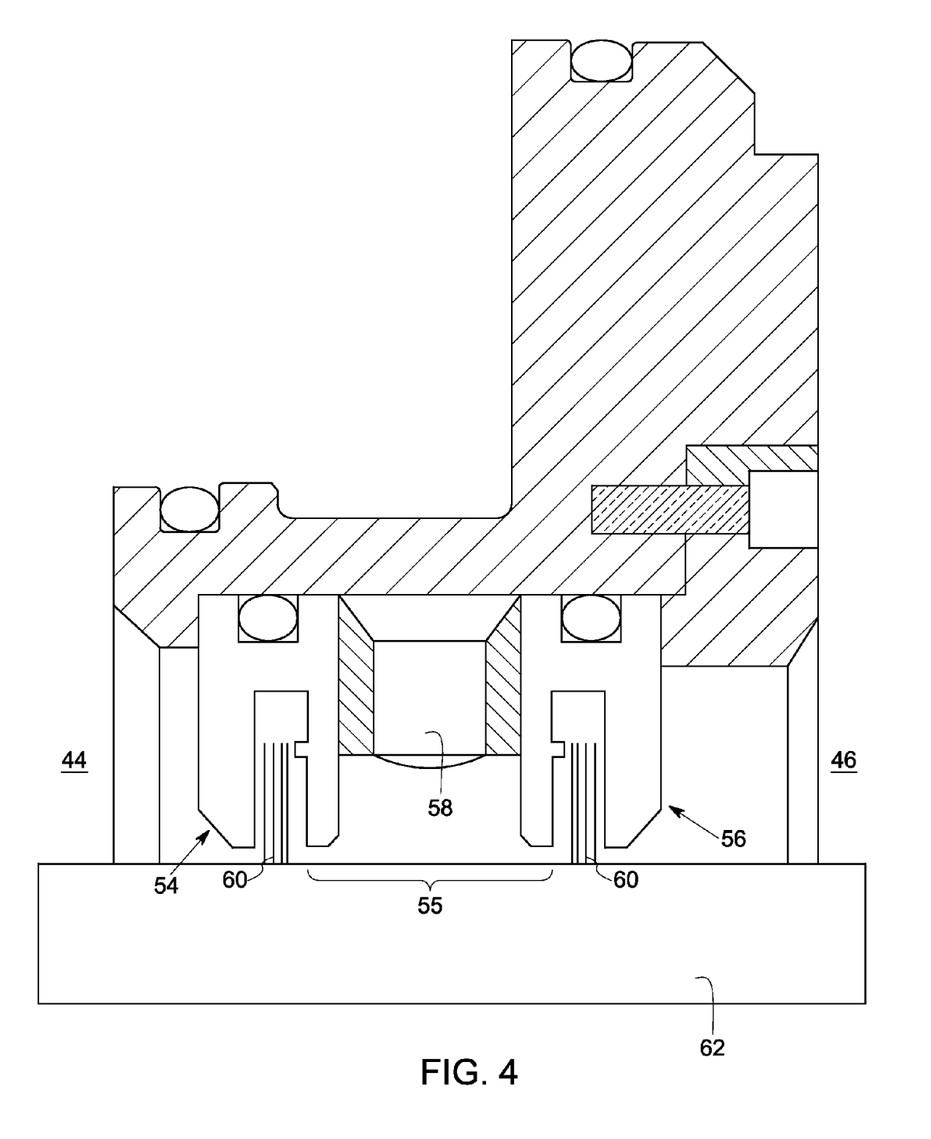
FIG. 4 is a diagrammatical representation of a barrier sealing device having at least two brush seals in accordance with another exemplary embodiment disclosed herein.

Referring to FIG. 4, the barrier seal 55 having the first static brush seal 54 and a second static brush seal 56 in accordance with another exemplary embodiment of the present invention is illustrated. The first static brush seal 54 is disposed on the compressor side 44 between the dry gas seals and the bearing. The second static brush seal 56 is disposed on the bearing side 46 between the first static brush seal 54 and the bearing. It should be noted herein that the second static brush seal 56 may be of the same type or of a different type compared to the first static brush seal 54. A spacer ring 58 is provided between the brush seals 54, 56. The protruding ends 60 of the brush seals 54, 56 are located proximate to or contacting a sleeve, for example a rotor sleeve 62 of the rotary machine. The sleeve 62 is fitted to the rotor of the machine and configured to containment against centrifugal forces encountered during machine operation. The sleeve 62 additionally prevents rotor coolant from weeping through the rotor into the air gap between the rotor and the stator to cause so-called "windage losses". The static brush seals are characterized by the absence of relative motion between sealing surfaces, or between the seal surface and a mating surface. In accordance with the illustrated exemplary embodiment of the present invention, the barrier seal 55 having the static brush seals 54, 56 provides effective barrier seal function in the rotary machine, i.e. the brush seals 54, 56 having non-metallic fibers effectively prevents migration of bearing lubrication oil during all operating conditions of the rotary machine.

Figure 5:
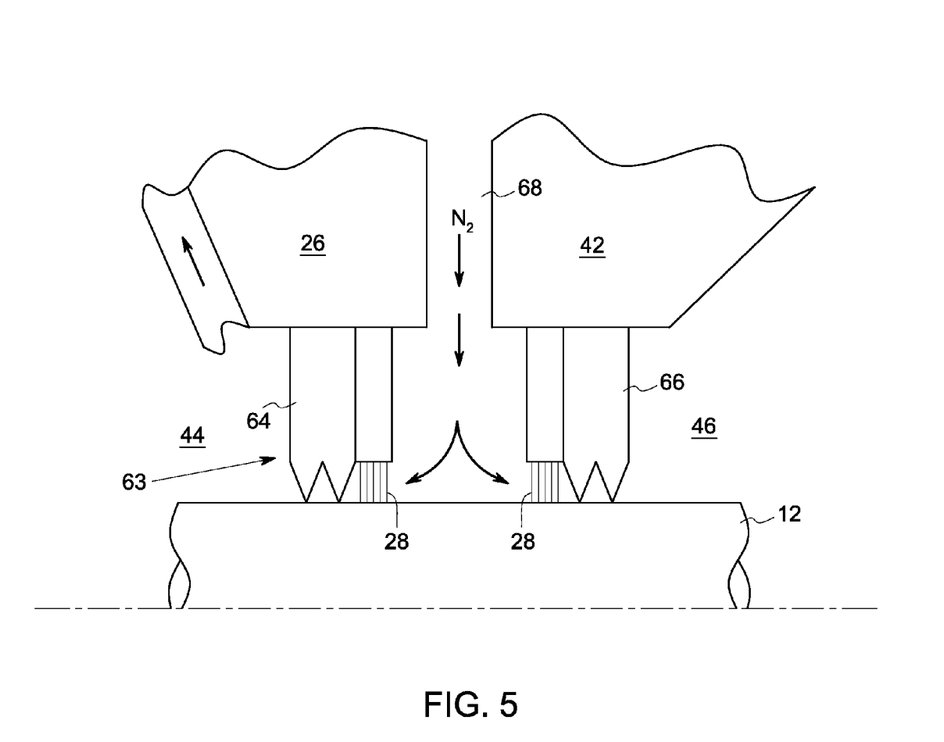
FIG. 5 is a diagrammatical representation of a hybrid barrier sealing device having at least two brush seals and labyrinth seals in accordance with another exemplary embodiment disclosed herein.

Referring to FIG. 5, a hybrid type barrier seal 63 in accordance with another exemplary embodiment is illustrated. In the illustrated embodiment, the hybrid type barrier seal 63 includes the first brush seal 26 is disposed on the compressor side 44 between the dry gas seals and the bearing and the second brush seal 42 disposed on the bearing side 46 between the first brush seal and the bearing. The illustrated barrier seal 63 includes a first labyrinth seal 64 and a second labyrinth seal 66 stacked in parallel with the first brush seal 26 and the second brush seal 42 respectively. Although two labyrinth seals 64, 66 are illustrated, more than two labyrinth seals may be stacked in parallel with the brush seals in alternate exemplary embodiments. In certain other exemplary embodiments, one or more seals such as carbon face seals, abradable labyrinth seals, metallic brush seals, or combinations thereof may be stacked in parallel with the first brush seal 26 and the second brush seal 42.

The first brush seal 26 and the second brush seal 42 in accordance with certain aspects of the present invention include a plurality of non-metallic fibers 28 configured to contact the rotor 12 so as to reduce leakage of bearing lubrication oil and also reduce temperature at a seal-rotor interface. A separation gas supply path 68 is provided between the brush seals 26, 42 so as to enable flow of a separation gas (e.g. nitrogen) between the seals 26, 42. During operation conditions of the barrier seal 24, a sealing gas (inert gas, e.g. nitrogen) flows via the supply path 68 between the first brush seal 26 and the second brush seal 42 and exits via a secondary vent 70. The flow of the gas generates an opening force to move the second brush seal 42 towards the bearing resulting in prevention of migration of bearing lubrication oil into the dry gas seals. In certain other exemplary embodiments, the labyrinth seals 64, 66 may be stacked in parallel with static brush seals and configured to contact the rotor sleeve of the rotary machine.

Although embodiments wherein both seals of barrier seal comprise brush seals including non-metallic fibers, other combinations are contemplated herein. For example, the seal that is closest to the bearing (typically referenced herein as "second seal") in conventional embodiments is not a brush seal. It is expected that using a brush seal of any type for this second seal will be beneficial and that using a brush seal including non-metallic fibers will provide additional improvements. Similarly, whether or not the second seal comprises a brush seal, having the seal that is closest to the compressor (typically referenced herein as "first seal" comprise a brush seal including non-metallic fibers offers the above discussed advantages as well.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotary machine, comprising:
   a machine rotor;
   a bearing coupled to the machine rotor;
   a machine stator; and
   a sealing device disposed between the machine rotor and the machine stator, the sealing device comprising:
   a dry gas seal,
   a first brush seal disposed between the dry gas seal and the bearing, wherein the first brush seal comprises a plurality of non-metallic fibers,
   a second brush seal disposed between the first brush seal and the bearing, wherein the second brush seal comprises a plurality of non-metallic fibers, and
   at least one mounting device configured for coupling the non-metallic fibers of the first brush seal or the second brush seal.

2. The machine of claim 1, wherein the at least one mounting device comprises an epoxy material.

3. The machine of claim 1, wherein the non-metallic fibers comprise Kevlar fibers, carbon fibers, carbide fibers, or combinations thereof.

4. The machine of claim 1, further comprising at least one additional seal stacked in parallel with the first brush seal or the second brush seal.

5. The machine of claim 4, wherein the least one additional seal comprises one or more carbon face seals, labyrinth seals, abradable labyrinth seals, metallic brush seals, or combinations thereof.

6. The machine of claim 1, wherein the first brush seal and the second brush seal are provided contacting the machine rotor.

7. The machine of claim 1, further comprising a machine sleeve, and wherein the first brush seal and the second brush seal are provided contacting the machine sleeve.

8. The machine of claim 1, wherein the machine comprises a centrifugal compressor.

9. A rotary compressor, comprising:
   a compressor rotor;
   a bearing coupled to the compressor rotor;
   a compressor stator; and a sealing device disposed between the compressor rotor and the compressor stator, the sealing device comprising:

a dry gas seal, a first brush seal disposed on a compressor side between the dry gas seal and the bearing, wherein the first brush seal comprises a plurality of non-metallic fibers;

a second seal disposed on a bearing side between the first brush seal and the bearing, and at least one mounting device configured for coupling the non-metallic fibers of the first brush seal.

10. The compressor of claim 9, wherein the at least one mounting device comprises an epoxy material.

11. The compressor of claim 9, wherein the non-metallic fibers comprises Kevlar fibers, carbon fibers, carbide fibers, or a combinations thereof.

12. The compressor of claim 9, further comprising carbon face seals, labyrinth seals, abradable labyrinth seals, metallic brush seals, or combinations thereof stacked in parallel with the first brush seal or the second seal.

13. The compressor of claim 9, wherein second seal comprises a non-metallic brush seal, a carbon face seal, a labyrinth seal, an abradable labyrinth seal, a metallic brush seal, or combinations thereof.

14. A rotary compressor, comprising:

a compressor rotor;

a bearing coupled to the compressor rotor;

a compressor stator; and a sealing device disposed between the compressor rotor and the compressor stator; comprising:

a dry gas seal;

a first seal disposed on a compressor side between the dry gas seal and the bearing;

a second brush seal disposed on a bearing side between the first seal and the bearing;

wherein the second brush seal comprises a plurality of non-metallic fibers; and at least one mounting device configured for coupling the non-metallic fibers of the second brush seal.

15. The compressor of claim 14, wherein the non-metallic fibers comprises Kevlar fibers, carbon fibers, carbide fibers, or a combination thereof.

16. The compressor of claim 14, further comprising carbon face seals, labyrinth seals, abradable labyrinth seals, metallic brush seals, or combinations thereof stacked in parallel with the first brush seal or the second brush seal.

17. The compressor of claim 14, wherein second first seal comprises a non-metallic brush seal, a carbon face seal, a labyrinth seal, an abradable labyrinth seal, a metallic brush seal, or combinations thereof.

18. A rotary machine, comprising:

a machine rotor;

a bearing coupled to the machine rotor;

a machine stator;

a machine sleeve; and a sealing device disposed between the machine rotor and the machine stator, the sealing device comprising:

a dry gas seal, a first brush seal disposed between the dry gas seal and the bearing, wherein the first brush seal comprises a plurality of non-metallic fibers, and a second brush seal disposed between the first brush seal and the bearing, wherein the second brush seal comprises a plurality of non-metallic fibers;

and wherein the first brush seal and the second brush seal are provided contacting the machine sleeve.

* * * * *

UNITED STATES PATENT AND TRADEMARK OFFICE
CERTIFICATE OF CORRECTION

| | | |
|---|---|---|
| PATENT NO. | : 7,854,584 B2 | |
| APPLICATION NO. | : 11/753014 | |
| DATED | : December 21, 2010 | |
| INVENTOR(S) | : Lusted et al. | |

It is certified that error appears in the above-identified patent and that said Letters Patent is hereby corrected as shown below:

In Column 8, Line 14, in Claim 17, replace "second" with "the".

Signed and Sealed this
Twenty-first Day of June, 2011

David J. Kappos
*Director of the United States Patent and Trademark Office*